United States Patent [19]

Anderson

[11] 3,957,574

[45] May 18, 1976

[54] SIZING METHOD AND COMPOSITION FOR USE THEREIN

[75] Inventor: Thomas Edward Anderson, West Malling, England

[73] Assignee: Hercules Powder Company Limited, London, England

[22] Filed: Jan. 6, 1975

[21] Appl. No.: 538,676

Related U.S. Application Data

[63] Continuation-in-part of Ser. No. 293,612, Sept. 29, 1972, abandoned.

[30] Foreign Application Priority Data

Oct. 20, 1971   United Kingdom............... 48856/71

[52] U.S. Cl................................ 162/167; 162/166; 260/17.3; 260/29.4 R
[51] Int. Cl.²....................... C08L 3/00; D21D 3/00
[58] Field of Search............ 260/17.3, 29.4 R, 69 R; 162/158, 162, 166, 167

[56] References Cited

UNITED STATES PATENTS

| | | | |
|---|---|---|---|
| 2,492,702 | 12/1949 | Neubert et al..................... | 260/17.3 |
| 2,576,241 | 11/1951 | Spangler.............................. | 260/69 |
| 2,950,268 | 8/1960 | Cofrancesco...................... | 260/29.4 |
| 3,006,806 | 10/1961 | Schur.................................. | 162/158 |
| 3,014,834 | 12/1961 | Pattilloch........................... | 162/165 |
| 3,575,796 | 4/1971 | Brown et al. ...................... | 162/158 |
| 3,582,461 | 6/1971 | Lipowski............................. | 162/72 |
| 3,594,272 | 7/1971 | Shen................................... | 162/167 |
| 3,840,486 | 10/1974 | Dumas............................... | 260/29.4 |

FOREIGN PATENTS OR APPLICATIONS

903,416   8/1962   United Kingdom................ 162/164

OTHER PUBLICATIONS

Publication: Imperial Chemical Industries Limited Dyestuffs Division 1970: "Dyes for Paper," Vol. I.
Chem. Absts. 79:20577c, "Sizing Mixtures," Anderson.

*Primary Examiner*—Harold D. Anderson
*Assistant Examiner*—Edward Woodberry
*Attorney, Agent, or Firm*—Charles L. Board

[57] ABSTRACT

In the production of sized paper and board using ketene dimer as sizing agent, there is used concomitantly with the ketene dimer a cationic polyelectrolyte so as to increase the sizing effect of the ketene dimer. The cationic polyelectrolyte is normally a dye fixative selected from water-soluble dicyandiamide-formaldehyde condensates. The cationic polyelectrolyte may be mixed with the ketene dimer so as to form a novel sizing composition which is preferably used in the form of an emulsion.

10 Claims, No Drawings

SIZING METHOD AND COMPOSITION FOR USE THEREIN

This application is a continuation-in-part of application Ser. No. 293,612, filed Sept. 29, 1972, now abandoned.

This invention relates to the production of sized paper or board and is concerned with a method of producing sized paper or board and with a novel sizing composition suitable for use in said method.

In the production of sized paper and board, it is conventional to add a sizing agent to the paper pulp slurry shortly before formation of the paper sheet (this is known as "internal sizing") or to treat the formed paper or board with a sizing agent (known as "external sizing"). Hitherto, the sizing agents most commonly used have been rosin and starch, but in recent years ketene dimers have been increasingly used in commercial practice as sizing agents for internal or external sizing. The ketene dimers are normally used in the form of an aqueous emulsion thereof, the emulsion being formed with the aid of a dispersing agent which is a non-ionic or more usually a cationic emulsifier such as a cationic starch. Such ketene dimer emulsions are described in, for example, United Kingdom Pat. Nos. 786,543 and 903,416.

In the use of ketene dimers as internal sizing agents in the manufacture of cellulosic paper from fibrous webs, the reaction between the ketene dimer and cellulose is believed to take place during the drying of the paper and continues in the dry paper. By submitting the paper to certain tests it is possible to predict the degree of sizing that ultimately may be expected in the paper. However since papermakers are normally reluctant to accept paper from the papermaking machine with a degree of sizing much below the required value and to rely on an improvement in the degree of sizing on ageing, it is normal practice to use excessive amounts of the ketene dimer sizing agent so as to obtain paper from the machine which has the desired degree, or substantially the desired degree, for sizing even before ageing. This obviously increases the cost of using such sizing agents. A further reason for the normal use of an excess of the ketene dimer is to obtain a sufficient degree of water resistance on the first section of the dry part of a paper machine to facilitate the application of further treatments of the paper sheet, before the final drying, with aqueous solutions, emulsions or suspensions, such as those employed in surface sizing and on-machine coating. If sizing is not adequate at this point, there is an excessive pick up of water and, with a lightweight sheet, possibility of a serious weakening of the web. There is also the need to dry off the excess water which adds to the load on the after-dryers, thereby increasing the consumption of steam and restricting the speed of the machine.

It is an object of the present invention to provide a method of increasing the sizing effect of ketene dimer sizing agents, whereby the aforementioned disadvantages in the use of such sizing agents may be avoided or at least mitigated and the overall efficiency of the ketene dimer sizing agent may be increased. It is another object of the present invention to provide a novel sizing composition based on ketene dimer sizing agents.

It has been found, in accordance with the present invention, that the addition of a member of a particular class of dye fixatives concomitantly with a ketene dimer sizing agent can cause a marked increase in the sizing effect of the ketene dimer sizing agent such that it is possible to obtain a degree of sizing on the paper machine which is higher than would otherwise be obtained in the absence of the dye fixative, thereby making it possible to reduce the quantity of ketene dimer required to obtain the same degree of sizing Thus in accordance with one aspect of the present invention, there is provided a method of producing sized paper or board from cellulose stock in which there is used, as an internal sizing agent, a ketene dimer, characterised in that there is incorporated in the cellulose stock concomitantly with the ketene dimer sizing agent a dye fixative selected from the class of dye fixatives consisting of water-soluble dicyandiamide-formaldehyde condensates, so as to obtain a sized paper or board having a higher degree of sizing than would be obtained using the same quantity of the ketene dimer sizing agent in the absence of the dye fixative. The dye fixative will of course be added in an amount sufficient to increase the sizing action of the ketene dimer. Generally the amount of said dye fixative incorporated into the cellulose stock will range from 0.05 to 2.0% by weight, based on the dry weight of the cellulose stock, whilst the amount of ketene dimer will range from 0.02 to 1.0% by weight, based on the dry weight of the cellulose stock.

In practice the ketene dimer sizing agent and the dye fixative may be added to the cellulose stock simultaneously in order to simplify the papermaking process and this can most easily be effected by the addition of a composition comprising a ketene dimer sizing agent and a dye fixative. In addition to simplifying the process, the use of such a composition gives increased sizing efficiency compared with that obtained with separate addition of the two components thereof.

Thus in accordance with another aspect of the present invention, there is provided a sizing composition comprising a ketene dimer sizing agent and a dye fixative selected from the aforementioned class.

The sizing composition of the invention will generally be used in the form of an aqueous emulsion containing a suitable emulsifier. The term "emulsion" is used herein, as is customary in the art, to mean either a dispersion of the liquid-in-liquid type or of the solid-in-liquid type.

The emulsifier employed may be chosen from the emulsifiers conventionally employed in the production of ketene dimer sizing emulsions. Such emulsifiers include cationic starches which are water-soluble starches carrying sufficient cationic amino, quaternary ammonium, or other cationic groups to render the starch as a whole cellulose-substantive. An example of such a cationic starch is the cationic amine modified starch described in the aforementioned United Kingdom Pat. No. 903,416.

Alternatively there may be employed as an emulsifier a water-soluble cationic thermosetting resin obtained by reacting a water-soluble polyamide, formed from a dibasic carboxylic acid and a polyalkylene polyamine containing from 2 to 8 alkylene groups, with epichlorohydrin. The polyamide used in preparing the resin may be formed from a saturated aliphatic dibasic carboxylic acid containing from 3 to 10 carbon atoms and the polyalkylene polyamine as described in, for example, United Kingdom Pat. No. 865,727. Preferably a saturated acid having from 4 to 6 carbon atoms is employed, namely succinic, glutaric or adipic acid. Diglycolic acid may also be used. The polyamide may alternatively be formed using an aromatic dicarboxylic acid, for example terephthalic acid, isophthalic acid or phthalic acid, or an α-unsaturated dicarboxylic acid, for example maleic acid, fumaric acid, itaconic acid, glutaconic acid, citraconic acid or mesaconic acid.

The temperatures employed for carrying out the reaction between the dibasic acid and the polyalkylene polyamine can vary from about 110°C. to about 250°C. at atmospheric pressure. Temperatures between about 160°C. and 210°C. are preferred. When reduced pressures are employed, somewhat lower temperatures may be utilized. The time of reaction depends on the temperatures and pressures utilized and will ordinarily vary from about ½ to 2 hours.

In carrying out the reaction, it is preferred to use an amount of dibasic acid sufficient to react substantially completely with the primary amine groups of the polyalkylene polyamine but insufficient to react with the secondary amine groups to any substantial extent. This will usually require a mole ratio of polyalkylene polyamine to dibasic acid of from about 0.9:1 to about 1.2:1. However, mole ratios of from about 0.8:1 to about 1.4:1 may be used.

Examples of suitable polyalkylene polyamines that can be used to prepare the water-soluble polyamide include diethylenetriamine, triethylenetetramine, tetraethylenepentamine and dipropylenetriamine.

The polyamide, formed as above described, is then converted to a cationic thermosetting resin by reacting it with epichlorohydrin at a temperature from about 45°C. to about 100°C. and preferably between about 45°C. and 70°C. until the viscosity of a 20% solids solution at 25°C. has reached about C or higher in the Gardner-Holdt Scale. This reaction is preferably carried out in aqueous solution to moderate the reaction.

When the desired viscosity is reached, sufficient water is then added to adjust the solids content of the resin solution to about 10 percent or less, the product cooled to about 25°C. and then stabilised by adding sufficient acid such as hydrochloric acid to reduce the pH at least to about 6 and preferably to at least about 5.

The ketene dimer employed as sizing agent in the present invention will normally be a higher ketene dimer represented by the general formula:

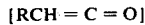

wherein R is a hydrocarbon radical selected from alkyl groups having at least 8 carbon atoms, cycloalkyl groups having at least 6 carbon atoms, aryl, aralkyl and alkaryl groups. Preferably the radical R is an alkyl group having at least 8 carbon atoms, advantageously hexadecyl and/or tetradecyl.

The dicyandiamide-formaldehyde condensates which are the preferred dye fixatives for use in this invention are the water-soluble thermosettable reaction products obtained by reaction of dicyandiamide, formaldehyde and an ammonium salt. The term "formaldehyde" is used herein as including not only formaldehyde per se but also formaldehyde in the form of 30–40% aqueous solutions and polymeric forms of formaldehyde such as, for example, paraformaldehyde and trioxane. Chemical compounds which can liberate formaldehyde on heating or acidification, for example acetals or hexamethylenetetramine, may be employed as precursors for the formaldehyde, if desired.

The ammonium salt reactant is a water-soluble salt of ammonia or an amine and an acid. Particularly suitable salts are those having the formula $(NH_4)_nX$; $(RNH_3)_nX$; or $(RR'NH_2)_nX$, where R and R' are each an alkyl radical having from 1 to 4 carbon atoms, for example methyl, ethyl, propyl, isopropyl, or n-butyl; X is an acid anion, for example $Cl^-$, $Br^-$, $I^-$, $SO_4^=$, $CH_3COO^-$, $NO_3^-$, or $PO_4^\equiv$ and n is an integer equal to the anion charge. Thus, for example, when X is $SO_4^=$, n is 2; when X is $Cl^-$, n is 1; and when X is $PO_4^\equiv$, n is 3. Specific examples of suitable ammonium salts are ammonium sulphate, ammonium chloride, methyl ammonium chloride, dimethyl ammonium chloride, ethylammonium sulphate and ammonium acetate.

Other suitable ammonium salts are the water-soluble salts of (1) a polyamine having the structure

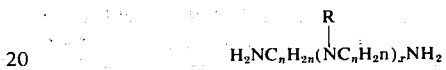

where R is hydrogen or methyl; n is an integer of 2 to 6, and x is an integer of 0 to 3 and (2) an acid such as sulphuric acid, hydrochloric acid, hydrobromic acid, hydroiodic acid, nitric acid, phosphoric acid or acetic acid. Specific examples of such polyamines are ethylene diamine, propylene diamine, hexamethylene diamine, diethylenetriamine, triethylenetetramine, tetraethylenepentamine and bis(3-aminopropyl)amine.

Methods of preparing condensates from the above reactants are well known in the art. A preferred procedure is set forth below.

Into a reaction vessel are placed about one mole of dicyandiamide and from about ¾ mole to about 1½ moles of formaldehyde. Water is conveniently employed as the reaction medium and sufficient water should be present in the mixture to provide an aqueous reaction mass that can be easily agitated (as by stirring) under reaction conditions. The amount of water employed is well within the skill of one versed in the art. The aqueous mixture is subsequently heated to reflux temperature (about 95°C.–105°C.) and refluxed for from about 15 minutes to about 30 minutes, or longer, if desired. Subsequently, the ammonium salt is added in an amount such that there will be from about 0.8 equivalent to about 1.2 equivalents, preferably about 1 equivalent, of basic nitrogen present in the reaction mixture. The resulting mixture is heated to reflux and maintained at reflux temperature until essentially all available nitriles (—C ≡ N) have reacted. This can be easily and readily determined by infra-red analysis. This will usually require a period of time of from about 2 to 4 hours.

Subsequently, there are added to the reaction mass from about 1.25 to about 3.75 moles of formaldehyde. The resulting mixture is then heated to reflux and maintained at reflux until the viscosity of an aqueous solution of the resinous reaction product having a solids content of from about 50 to about 60 percent is from about G to X on the Gardner-Holdt scale (measured at 25°C.) and preferably from about S to X.

If desired, the water-soluble thermosettable condensation products can be derived by providing a mixture of all the above ingredients in the above amounts (employing, as above, water as the reaction medium), heating the mixture to reflux and maintaining at reflux until the viscosity of an aqueous solution of the resinous reaction product having a solids content of from about 50 to about 60 percent is from about G to X, preferably S to X, on the Gardner-Holdt scale (measured at 25°C.).

In the present invention the dye fixative and ketene dimer may be used in a weight ratio ranging from about 10:1 to about 1:10.

The preferred aqueous emulsions of this invention will consist essentially of, by weight, (I) from about 3 to about 30 parts solids and (II) from about 97 to about 70 parts water, the total of (I) and (II) being 100 parts. The solids content will consist essentially of, by weight, (a) from about 1 to about 12 parts ketene dimer, (b) from about 1 to about 25 parts dicyandiamide-formaldehyde-ammonium salt condensate and (c) from about 1 to about 25 parts emulsifier, the amounts of (a), (b) and (c) being selected so that the total weight thereof will be in the range 3 to 30 parts.

The sizing composition of the invention may be prepared by blending the dye fixative with the ketene dimer sizing agent preferably in the form of an emulsion, the blending being carried out in, for example, a vessel provided with agitation means, so as to form the sizing composition.

If it is desired to accelerate the sizing rate obtained with the sizing composition of the present invention, this may be effected by pre-treatment of the cellulose stock with a cationic polyelectrolyte, for example a dye fixative such as a dicyandiamide-formaldehyde condensate as hereinabove described.

When using the sizing composition of the invention, it is possible in certain cases to dispense with the subsequent use of the retention aids conventionally employed immediately before sheet formation, since it has been found that the sizing composition itself has sufficient stability in the papermaking system to act as a retention aid.

It will be appreciated that whilst the sizing composition of the invention is principally of advantage when used in internal sizing, it may if desired also be used in external sizing methods. Thus the sizing composition may be applied to the surface of a prepared paper sheet by means of, for example, a size press, a coating head or a spray boom. The composition may be applied with water or mixed with a suitable starch for surface treatment, or as part of the liquid system in a coating slip.

The following Examples illustrate the invention.

EXAMPLE 1

An aqueous ketene dimer emulsion was prepared from a mixed tetradecyl/hexadecyl ketene dimer (produced from a mixture of palmitic and stearic acids) and dimethylaminoethyl potato starch, the emulsion containing 6% by weight of the dimer and 3% by weight of the cationic amine modified starch.

This emulsion (referred to as "Emulsion A" for comparison purposes in Example 6) was then blended in a volume ratio of 80:20, with a commercially available dye fixative based on dicyandiamide-formaldehyde condensate, marketed as a 50% by weight aqueous solution in the United Kingdom by I.C.I. Limited under the trade designation Fixanol PN (now known as Perminal FC-P), in a vessel equipped with agitation means to form the required sizing composition.

EXAMPLE 2

An aminopolyamide was formed by adding 219.3 parts by weight of adipic acid slowly, with stirring, to 151.3 parts by weight of diethylenetriamine in a flask fitted with a stirrer and a condenser for collecting water distillate. The reaction mixture was stirred and heated at 170°–180°C. under a nitrogen blanket until amide formation was complete. After air cooling to approximately 140°C., hot water was added with stirring to provide a 50 percent solids solution of polyamide resin with an intrinsic viscosity of 0.140 measured by using a 2% solution of $\underline{N}$ NH$_4$Cl. An epichlorohydrin derivative of the aminopolyamide was prepared by adding 150 parts by weight of water to 50 parts by weight of the 50 percent solids solution and then adding 13.7 parts by weight (0.149 mole) of epichlorohydrin. The reaction mixture was heated at 70°C. with stirring under reflux until the Gardner-Holdt viscosity attained a value of D. Sufficient water was added to provide a solids content of about 10 percent. Sulphuric acid was then added to adjust the pH of the solution to about 5 to obtain a solution of the required aminopolyamide-epichlorohydrin resin.

An aqueous ketene dimer emulsion was prepared from a mixture of 6 parts by weight of a mixed tetradecyl/hexadecyl ketene dimer (produced from a mixture of palmitic and stearic acids) and 60 parts by weight of the water-soluble cationic aminopolyamide-epichlorohydrin resin solution prepared in the foregoing manner, and 33 parts by weight of water. The mixture was heated to and maintained at 60°C. until the dimer had melted after which it was dispersed with agitation. The mixture was then homogenised and the emulsion so formed was cooled to 40°C. This emulsion is referred to as "Emulsion B" for comparison purposes in Example 6.

This emulsion was then blended in a volume ratio of 80:20, with the commercially available dye fixative Fixanol PN, as in Example 1, to form the required sizing composition.

EXAMPLE 3

A conventional Fourdrinier papermaking machine was employed to make sized paper using the normal sequence of mechanical operations. This machine was also equipped with a coating system capable of subjecting the dried paper to a further finishing operation, namely the application of a slurry or slip containing clay as pigment and various organic binders, to the paper sheet surface.

Following disintegration of the pulp and refining to form thick stock at 3 percent consistency, 5lbs/ton of the commercially available dye fixative Fixanol PN were added continuously at the stuff gate headbox.

3 lbs/ton (calculated as ketene dimer) of an aqueous ketene dimer emulsion, prepared from a mixed tetradecyl/hexadecyl ketene dimer (produced from a mixture of palmitic and stearic acids) and dimethylaminoethyl potato starch, the emulsion containing 6% by weight of the dimer and 3% by weight of the cationic amine modified starch, were then added as sizing agent to the stock at the inlet to the primary fan pump immediately before the hydrocyclone stock cleaners. After further dilution at the secondary fan pump, the stock was cleaned in centriscreens and 10 lbs. of a 10% by weight aqueous solution of a water-soluble cationic resin prepared as described in the foregoing Example 2 were then added at this point as a retention aid for fibre and filler. The sheet was then formed on the machine wire, pressed, dried and coated. After further drying the sheet was calendered and reeled in the conventional manner.

The paper sheet was tested immediately off machine and in addition random samples of the dried sheet were obtained before coating. In each case the sizing level was determined and fibre and filler retention tests were carried out to determine the standard retention level.

Three hours after sufficient results were obtained to ensure that the system was in equilibrium, the addition of Fixanol PN at the stuff gate headbox was discontinued and the ketene dimer sizing agent was replaced by the sizing composition prepared as described in the foregoing Example 1, at the same addition rate. This change resulted in an improved sizing level, so that the addition rate of the sizing composition was reduced to obtain the original sizing level under equilibrium conditions. The final addition rate was then 2 lbs. per ton, calculated as ketene dimer. Subsequently the addition of the retention aid was discontinued without alteration in the retention level, as determined by further retention tests. This represented a saving of 33% in ketene dimer addition.

The foregoing procedure was then repeated under identical conditions but with the sizing composition prepared as described in the foregoing Example 2 being used instead of that of Example 1. The addition rate was initially 2 lbs. per ton, calculated as ketene dimer. No retention aid was employed. As before, the sizing level improved and the addition rate was reduced until under equilibrium conditions the original sizing level was maintained. The addition rate was then 1 lb. per ton, calculated as ketene dimer, representing a 66 percent saving in ketene dimer addition. As before, retention tests indicated that the retention level remained standard.

The foregoing Example demonstrates the reduction in the amount of ketene dimer addition and the elimination of retention aid addition whilst maintaining the same sizing and retention levels which can be achieved by means of the method and sizing composition of this invention.

EXAMPLE 4

An aqueous ketene dimer emulsion was prepared from a mixed tetradecyl/hexadecyl ketene dimer (produced from a mixture of plamitic and stearic acids) and dimethylaminoethyl potato starch, the emulsion containing 6% by weight of the dimer and 3% by weight of the cationic amine modified starch.

A dicyandiamide-formaldehyde condensation product, usable as a dye fixative, was prepared by refluxing in a vessel equipped with a cooling system 27.3 parts by weight of dicyandiamide with 27.2 parts by weight of 37% w/v formalin solution at 101°C. for 15 minutes. The temperature was reduced to 45°C. using the cooling system with which the vessel was equipped. 15.2 parts by weight of ammonium chloride were added slowly over 20 minutes and then the temperature was raised to 110°C. over a period of one hour, following which the mixture was refluxed for a further hour. After cooling to 75°C., a further 33.9 parts by weight of the 37% formalin solution were added and the temperature further reduced to 60°C. The resulting liquid was filtered to obtain the required liquid condensation product.

The ketene dimer emulsion was then blended with the condensation product in a volume ratio of 80:20 in a vessel equipped with agitation means to form a sizing composition.

EXAMPLE 5

An aqueous ketene dimer emulsion was prepared from a mixed tetradecyl/hexadecyl ketene dimer (produced from a mixture of palmitic and stearic acids) and the aminopolyamideepichlorohydrin resin described in Example 2. The emulsion contained, by weight, 6% of the dimer and 6% of the resin.

This ketene dimer emulsion was blended in a volume ratio of 80:20 with a dicyandiamide-formaldehyde condensation product prepared as described in Example 4, the blending being carried out in a vessel equipped with agitation means, to form a sizing composition.

EXAMPLE 6

In order to compare the sizing effect of sizing compositions in accordance with the invention with the corresponding known sizing compositions containing no dicyandiamide-formaldehyde condensate, the following test procedure was carried out.

Laboratory handsheets were prepared on a Noble Wood apparatus from Wargen's soft wood sulphite pulp beaten to 43° Schopper Riegler. The beaten stock with 14% English China clay grade B based on the amount of fibre was adjusted to a consistency of 0.28 percent in the proportioner of the apparatus and mixed well. The sizing composition to be tested was added to a portion of the stock in the proportioner in an amount such that the ratio of ketene dimer to the cellulose fibre was 0.12 to 100. Each portion of stock was used to prepare a laboratory handsheet by the standard procedure. After sheet formation the sheet was dried, separated from the wire gauze and promptly tested for its level of sizing by the 1-minute Cobb test. Part of the sheet only was used in this test, the remainder of the sheet being retained and maintained at 60 percent relative humidity (R.H.) and at a temperature of 68°F. for 24 hours to cure naturally and then tested for size properties in the same manner.

The following Table shows the test results obtained.

TABLE

| Sizing composition | 1 minute Cobb Test Size Reslts (given in grams of water picked up in 1 minute by 1 square meter of paper) | |
|---|---|---|
| | Promptly after sheet was dried | After 24 hours at 68°F.60% R.H |
| Emulsion A | 57 | 51 |
| Composition of Example 1 | 37 | 33 |
| Composition of Example 4 | 47 | 40 |
| Emulsion B | 50 | 50 |
| Composition of Example 2 | 39 | 35 |
| Composition of Example 5 | 43 | 40 |

The foregoing Table clearly shows the marked improvement obtained by the presence in the sizing composition of a dicyandiamide-formaldehyde condensate in accordance with the invention.

What is claimed is:

1. A sizing composition in the form of an aqueous emulsion consisting essentially of a ketene dimer sizing agent, an emulsifier and a dye fixative selected from the class of dye fixatives consisting of water-soluble dicyandiamideformaldehyde condensates obtained by the reaction of dicyandiamide, formaldehyde and an ammonium salt.

2. A composition as claimed in claim 1, wherein the aqueous emulsion consists of, by weight, from 3 to 30 parts solids and from 97 to 70 parts water, the total of solids and water being 100 parts, and wherein the solids content consists of, by weight, (a) from 1 to 12 parts ketene dimer, (b) from 1 to 25 parts dicyandiamide-formaldehyde-ammonium salt condensate and (c) from 1 to 25 parts emulsifier, the amounts of (a), (b) and (c) being selected so that the total weight thereof will be in the range 3 to 30 parts.

3. A composition as claimed in claim 1, wherein the emulsifier is a cationic starch.

4. A composition as claimed in claim 3, wherein the cationic starch is a cationic amine modified starch.

5. A composition as claimed in claim 1, wherein the emulsifier is a water-soluble cationic thermosetting resin obtained by reacting a water-soluble polyamide, formed from a dibasic carboxylic acid and a polyalkylene polyamine containing from 2 to 8 alkylene groups, with epichlorohydrin.

6. A composition as claim in claim 1, wherein the emulsifier is a water-soluble cationic thermosetting resin obtained by reacting a water-soluble polyamide, formed from a saturated aliphatic dibasic carboxylic acid containing from 3 to 10 carbon atoms and a polyalkylene polyamine containing from 2 to 8 alkylene groups, with epichlorohydrin.

7. A composition as claimed in claim 6, wherein the carboxylic acid contains from 4 to 6 carbon atoms.

8. A method of producing sized paper of board from cellulose stock in which a ketene dimer is used as sizing agent, characterised in that there is incorporated in the cellulose stock concomitantly with the ketene dimer sizing agent a dye fixative which is a water-soluble dicyandiamide-formaldehyde condensate obtained by the reaction of dicyandiamide, formaldehyde and an ammonium salt, so as to obtain a sized paper or board having a higher degree of sizing than would be obtained using the same quantity of the ketene dimer sizing agent in the absence of the dye fixative.

9. A method according to claim 8, wherein there is incorporated into the cellulose stock from 0.05 to 2.0% by weight, based on the dry weight of the cellulose stock, of the ketene dimer and from 0.02 to 1.0% by weight, based on the dry weight of the cellulose stock, of the dye fixative.

10. A method according to claim 8, wherein the ketene dimer and dye fixative are added simultaneously to the cellulose stock in the form of an aqueous emulsion comprising ketene dimer sizing agent, dye fixative and an emulsifier.

* * * * *

UNITED STATES PATENT AND TRADEMARK OFFICE
CERTIFICATE OF CORRECTION

PATENT NO. : 3,957,574
DATED : May 18, 1976
INVENTOR(S) : Thomas E. Anderson

It is certified that error appears in the above—identified patent and that said Letters Patent are hereby corrected as shown below:

Column 1, line 42 " for sizing " should read -- of sizing --.

Column 3, line 48 " $[RCH=C=O]$ " should read -- $[RCH=C=O]_2$ --.

Column 4, lines 7 and 9 " $SO_4^-$ " should read -- $SO_4^=$ --.

Column 4, line 8 italicized " or $PO_4^-$ " should read -- or $PO_4^{\equiv}$ --.

Column 4, line 10 " $PO_4^-$ " should read -- $PO_4^{\equiv}$ --.

Signed and Sealed this

Twentieth Day of July 1976

[SEAL]

Attest:

RUTH C. MASON
*Attesting Officer*

C. MARSHALL DANN
*Commissioner of Patents and Trademarks*